(12) United States Patent
Patterson et al.

(10) Patent No.: US 8,317,158 B2
(45) Date of Patent: Nov. 27, 2012

(54) VALVE ASSEMBLIES INCLUDING CORRUGATED FLOWBODY AND METHOD FOR THE MANUFACTURE THEREOF

(75) Inventors: Steve Patterson, Phoenix, AZ (US); Joel LaBenz, Chandler, AZ (US); Ara Briley, Tempe, AZ (US); Rene Villalba, Mexicali (MX); Scott Martin, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 312 days.

(21) Appl. No.: 12/635,163

(22) Filed: Dec. 10, 2009

(65) Prior Publication Data

US 2011/0140022 A1 Jun. 16, 2011

(51) Int. Cl.
*F16K 27/00* (2006.01)
(52) U.S. Cl. .................. 251/366; 137/527.8; 251/298
(58) Field of Classification Search .................. 251/298, 251/303, 366; 137/527.8
See application file for complete search history.

(56) References Cited

U.S. PATENT DOCUMENTS

| 2,208,180 | A | * | 7/1940 | Delleani | 251/359 |
|---|---|---|---|---|---|
| 2,337,841 | A | * | 12/1943 | Shafer | 137/553 |
| 2,852,037 | A | * | 9/1958 | Downing et al. | 137/467 |
| 3,638,908 | A | * | 2/1972 | Grove | 251/329 |
| 3,751,004 | A | * | 8/1973 | Quirk | 251/366 |
| 3,858,755 | A | * | 1/1975 | Tellen | 220/284 |
| 3,934,608 | A | * | 1/1976 | Guyton | 137/527.8 |
| 4,230,150 | A | * | 10/1980 | Scaramucci | 137/527 |
| 4,243,203 | A | * | 1/1981 | Mack | 251/305 |
| 4,498,492 | A | * | 2/1985 | Carpentier | 137/315.16 |
| 5,402,603 | A | * | 4/1995 | Henley | 48/192 |
| 5,916,023 | A | * | 6/1999 | Meyer | 454/359 |
| 6,289,531 | B1 | * | 9/2001 | Kahle et al. | 4/678 |
| 6,360,766 | B1 | | 3/2002 | Sawert et al. | |
| 7,438,250 | B2 | * | 10/2008 | Anderson et al. | 242/395 |
| 2008/0236671 | A1 | | 10/2008 | Claude | |

* cited by examiner

*Primary Examiner* — John K Fristoe, Jr.
*Assistant Examiner* — R. K. Arundale
(74) *Attorney, Agent, or Firm* — Ingrassia Fisher & Lorenz, P.C.

(57) ABSTRACT

Flapper valve assemblies are provided. One flapper valve assembly includes a flowbody, a flapper valve element, and an elongated stiffening rib formed in the flowbody. The flowbody includes a generally flat plate portion, and an arcuate portion adjacent the generally flat plate portion. The flapper valve element is hingedly coupled to the flowbody proximate the generally flat plate portion. The elongated stiffening rib extends from the generally flat plate portion to the arcuate portion to distribute mechanical stress and to reduce deflection of the flowbody during pressure loading.

20 Claims, 5 Drawing Sheets

VALVE ASSEMBLIES INCLUDING CORRUGATED FLOWBODY AND METHOD FOR THE MANUFACTURE THEREOF

TECHNICAL FIELD

The present invention relates generally to reinforced valve assemblies and, more particularly, to embodiments of a corrugated flapper valve assembly well-suited for deployment onboard an aircraft.

BACKGROUND

Flapper valve assemblies are commonly deployed onboard aircraft to regulate the flow of a fluid; e.g., as a specific example, a flapper valve assembly may be utilized as a check valve to prevent back airflow within an aircraft cabin air conditioning system. A generalized flapper valve assembly includes a flowbody housing (referred to herein simply as a "flowbody"), a flow passage formed through the flowbody, a flapper valve element (e.g., a rectangular or circular plate), and various other structural elements (e.g., a hard stop feature, a spring or other damping member, etc.). The flapper valve element is hingedly mounted to the flowbody and is movable between a fully open position, a closed position, and various intermediate positions. The flowbody is formed to include a flat plate portion, which accommodates the flapper valve element in the fully open position (commonly referred to as a "mailbox" configuration). More specifically, the flapper valve element is hingedly mounted to the flowbody proximate the leading or upstream edge of the flat plate portion. When transitioning into the fully open position, the flapper valve element rotates into a position adjacent the flat plate portion and is effectively removed from the flow path. By removing the flapper valve element from the flow path in this manner, fluid flow through the flowbody is optimized and valve element flutter is reduced or eliminated. In addition, when the flapper valve assembly is deployed onboard an aircraft, removal of the flapper valve element from the flow path helps to minimize the accumulation of ice within the flowbody during flight.

When deployed onboard an aircraft, it is desirable for a flapper valve assembly to be relatively lightweight. At the same time, it is desirable for the flapper valve assembly to be capable of withstanding significant pressure loading conditions without premature fatigue and the possible development of leakage paths. In general, the weight of a valve assembly can be minimized by reducing flowbody wall thickness; however, reducing flowbody wall thickness results in a corresponding reduction in the pressure loading capabilities of the valve assembly. In conventional flapper valve assemblies of the type described above, the flat plate portion of the flowbody has poor structural stiffness and consequently tends to experience relatively large deflection (bulges outward) when subjected to high pressure loading conditions. Deflection of the flowbody's flat plate portion becomes increasingly problematic as the scale of the flapper valve assembly increases and, therefore, as the surface area of the flat plate area increases. Furthermore, corners are inherently formed in the transitional area between the flowbody's flat plate portion and the remainder of the flowbody, which is typically characterized by a generally annular or arcuate cross-sectional geometry. While adding a certain amount of structural stiffness, these corners produce undesirable stress concentrations in certain regions of the flowbody during pressure loading, which, in turn, can result in premature fatigue of the flapper valve assembly.

Considering the above, there exists an ongoing need to provide embodiments of a lightweight flapper valve assembly that includes a flat plate portion resistive to physical deflection and that provides a more uniform stress distribution during high pressure loading conditions. It is also desirable to provide embodiments of a method for manufacturing such a lightweight flapper valve assembly. Other desirable features and characteristics of the present invention will become apparent from the subsequent Detailed Description and the appended claims, taken in conjunction with the accompanying Drawings and this Background.

BRIEF SUMMARY

Embodiments of a flapper valve assembly are provided. In one embodiment, the flapper valve assembly includes a flowbody, a flapper valve element, and an elongated stiffening rib formed in the flowbody. The flowbody includes a generally flat plate portion and an arcuate portion adjacent the generally flat plate portion. The flapper valve element is hingedly coupled to the flowbody proximate the generally flat plate portion. The elongated stiffening rib extends from the generally flat plate portion to the arcuate portion to distribute mechanical stress and to reduce deflection of the flowbody during pressure loading.

Embodiments of a method for manufacturing a flapper valve assembly are further provided. In one embodiment, the method includes the step forming a corrugated flowbody from at least one metal sheet. The corrugated flowbody is formed to include a generally flat plate portion, an arcuate portion adjacent the generally flat plate portion, and an elongated stiffening rib extending from the generally flat plate portion to the arcuate portion to distribute mechanical stress and to reduce deflection of the flowbody during pressure loading. The method further includes the step of hingedly coupling a flapper valve element to the corrugated flowbody proximate the generally flat plate portion.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
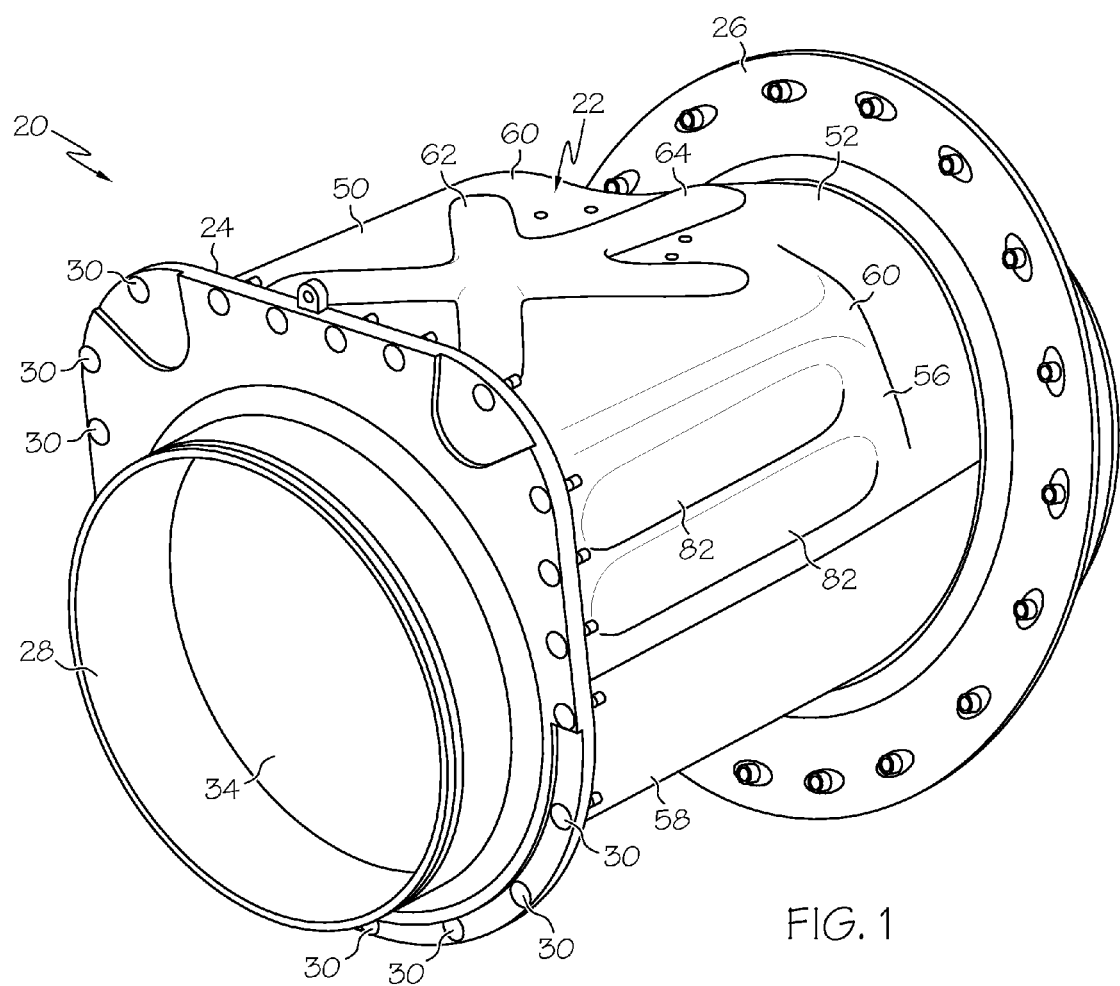
FIG. 1 is an isometric view of a flapper valve assembly including a corrugated flowbody in accordance with an exemplary embodiment.
Figure 2:
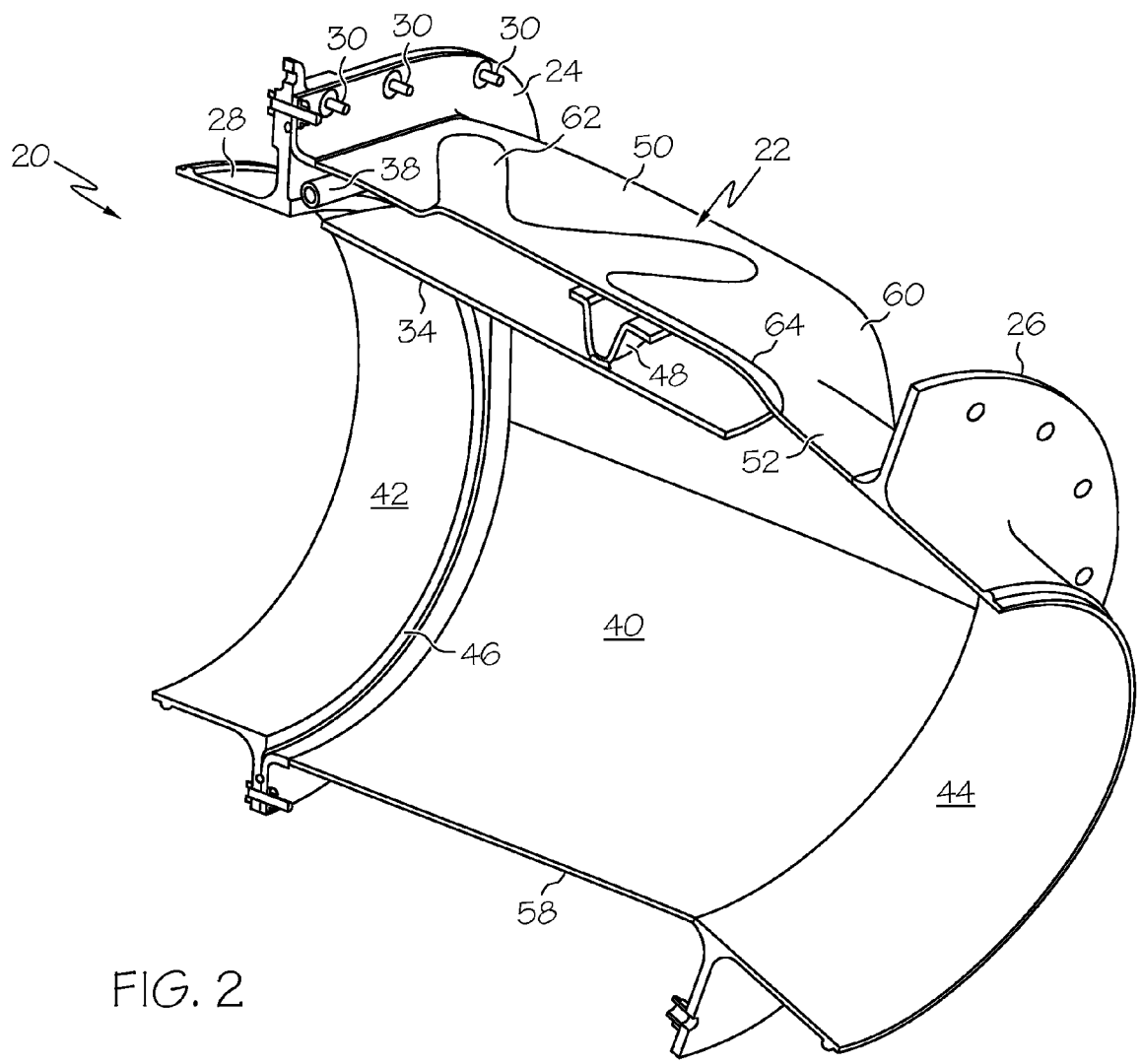
FIGS. 2 and 3 are cross-sectional views of the exemplary flapper valve assembly shown in FIG. 1 in fully open and closed positions, respectively.
Figure 3:
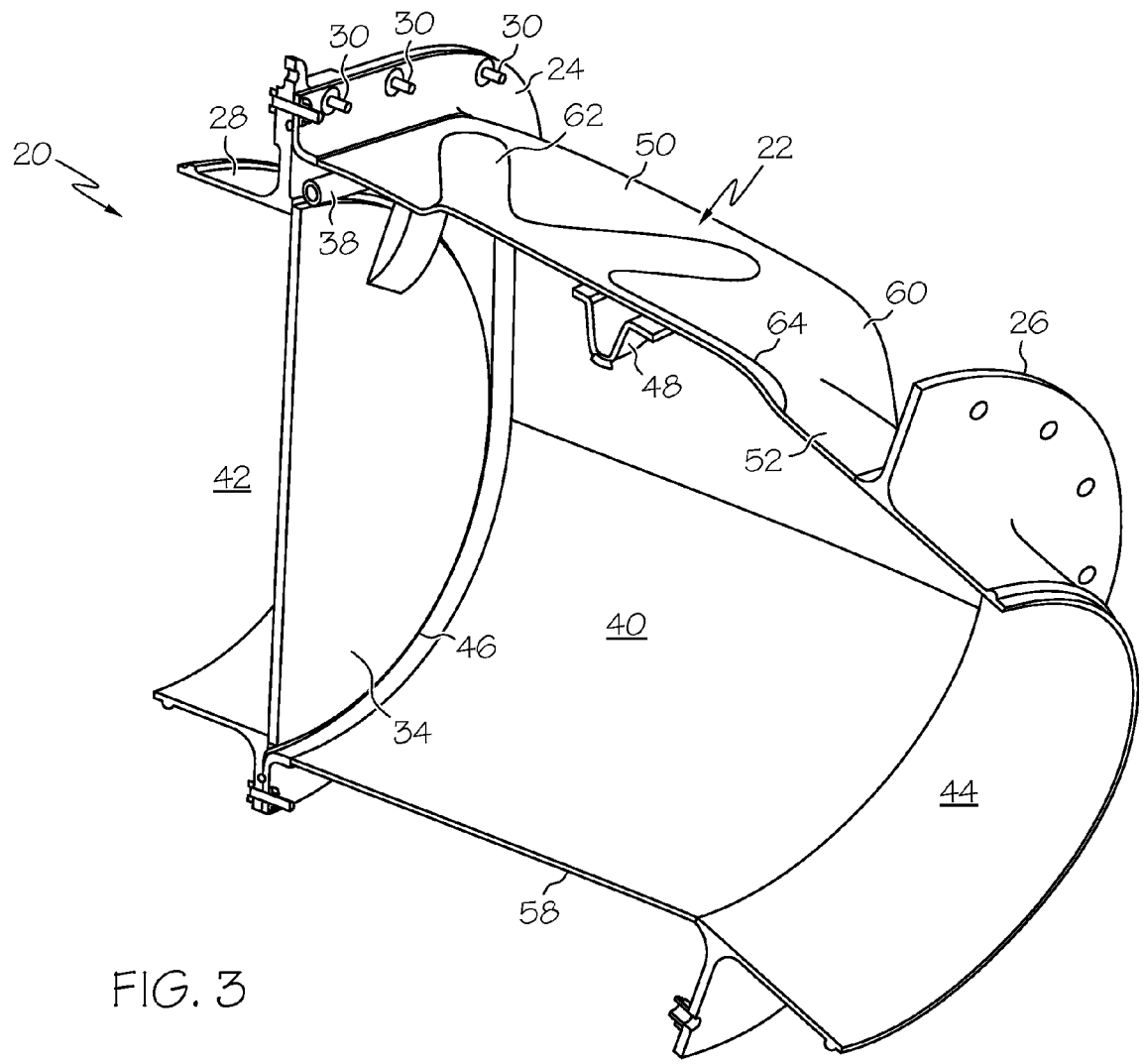

FIG. 1 is an isometric view of a flapper valve assembly 20 including a corrugated flowbody 22 in accordance with an exemplary embodiment of the present invention; and FIGS. 2 and 3 are cross-sectional views of flapper valve assembly 20 in fully open and closed positions, respectively. As will be described more fully below, corrugated flowbody 22 is relatively lightweight and capable of withstanding relatively high pressure loading conditions without premature fatigue or rupture. As a result, flapper valve assembly 20 is well-suited for deployment onboard an aircraft as, for example, a check valve in a cabin air conditioning system. This notwithstanding, flapper valve assembly 20 is by no means limited to deployment onboard an aircraft and can be utilized in various other applications and environments wherein weight savings and structural durability under high pressure loading conditions are desired. As utilized herein, the term "flapper valve element" is defined broadly to include any structural element or assemblage of structural elements that is hingedly coupled, either directly or indirectly, to a flowbody and that can be moved between a range of positions to influence the flow of air or other fluid through the flowbody. Similarly, the term "flapper valve assembly" is utilized to denote any valve assembly including a flapper valve element as previously defined.

One or more flanges may be joined to corrugated flowbody 22. In the exemplary embodiment illustrated in FIGS. 1-3, specifically, three flanges are joined to corrugated flowbody 22: a connecting flange 24, an outlet or bulkhead flange 26, and an inlet flange 28. Connecting flange 24 and bulkhead flange 26 are fixedly joined to opposing ends of flowbody 22 utilizing, for example, a welding process. Inlet flange 28 is, in turn, attached to connecting flange 24 utilizing a plurality of bolts 30 or other such fasteners. When flapper valve assembly 20 is mounted within a cabin air conditioning system (or other fluidic system), bulkhead flange 26 and inlet flange 28 are conveniently mounted to downstream and upstream duct members (not shown), respectively, in a conventionally known manner.

As shown most clearly in FIGS. 2 and 3, a flow passage 40 is provided through corrugated flowbody 22. Flow passage 40 includes a first port and a second port, which, in the illustrated example, assume the form of an inlet 42 and an outlet 44, respectively. A flapper valve element 34 (e.g., a generally circular or rectangular plate) is hingedly coupled to corrugated flowbody 22. Flapper valve element 34 may be directly mounted to corrugated flowbody 22, or valve element 34 may be indirectly coupled to flowbody 22 through one or more intervening structures, such as connecting flange 24 and/or inlet flange 28. In the exemplary embodiment shown in FIGS. 2 and 3, specifically, flapper valve element 34 is hingedly mounted to inner portion of inlet flange 28 utilizing a hinge pin 38. Flapper valve element 34 is movable between a fully open position (FIG. 2), a closed position (FIG. 3), and various intermediate positions (not shown). In the open position shown in FIG. 2, flapper valve element 34 contacts a hard stop feature 48 mounted to an inner surface of corrugated flowbody 22. In the closed position shown in FIG. 3, flapper valve element 34 sealingly contacts a seat 46 provided on inlet flange 28 to block substantially all fluid flow through flow passage 40. This example notwithstanding, flapper valve assembly 20 may not include a hard stop feature and flapper valve element 34 may only partially block fluid flow in the closed position in alternative embodiments.

The movement of flapper valve element 34 may or may not be controlled by a servomechanism or other external control device (not shown). In addition, flapper valve element 34 may or may not be biased toward the fully open position (FIG. 2) or the closed position (FIG. 3) by a spring member or other biasing means (not shown). As noted above, flapper valve assembly 20 is conveniently utilized as a check valve to prevent back airflow in a cabin air conditioning system. When utilized in such a manner, flapper valve element 34 may be biased toward the closed position (FIG. 3) by gravity and rotate from the closed position (FIG. 3) toward the fully open position (FIG. 2) when the forces exerted on the upstream face of flapper valve element 34 surpass a minimum threshold. Flapper valve assembly 20 may include various other conventionally-known components that are not shown in FIGS. 1-3 for clarity, such as one or more spring members disposed around hinge pin 38 to provide damping as flapper valve element 34 rotates into the fully open position (FIG. 2) and/or the closed position (FIG. 3).

Figure 4:
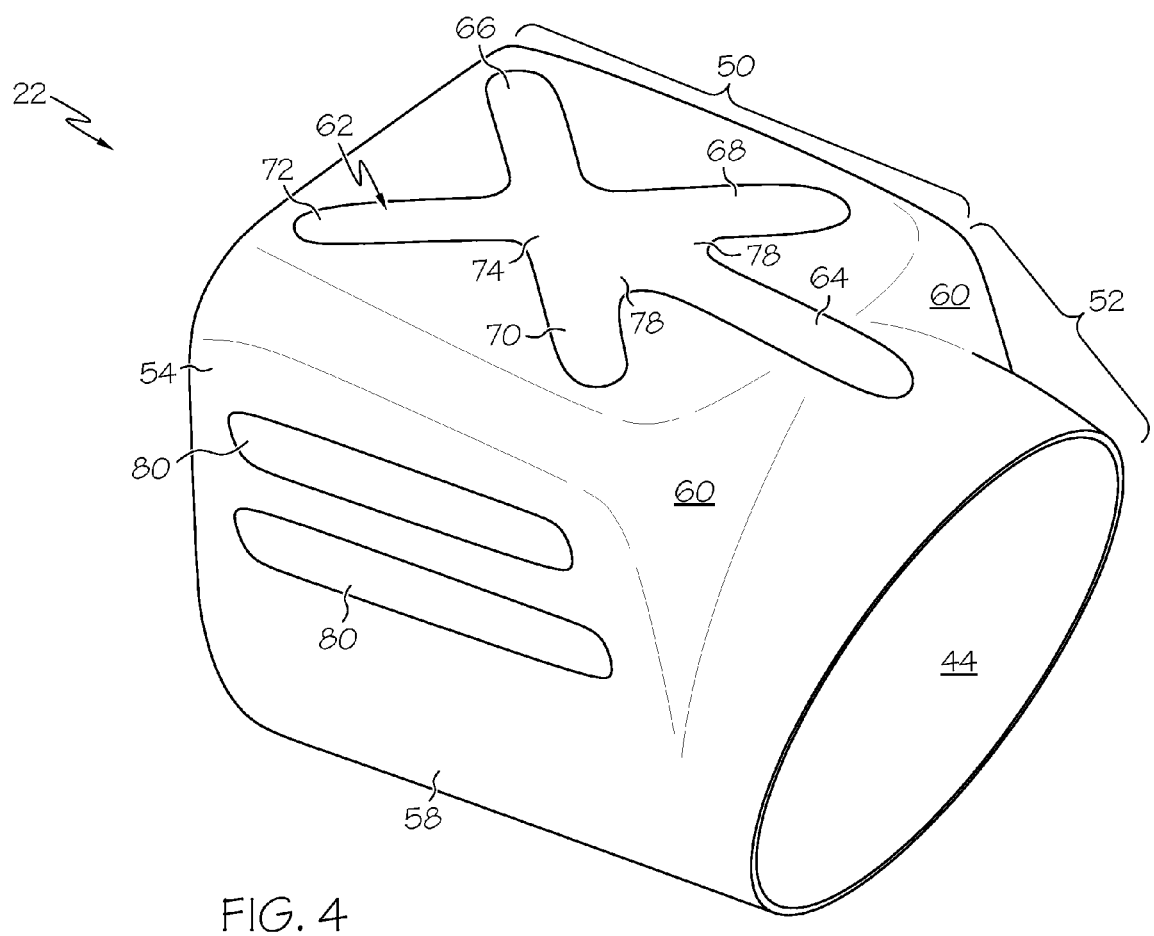
FIGS. 4 and 5 are top and side isometric views, respectively, of the exemplary corrugated flowbody included within the flapper valve assembly shown in FIGS. 1-3.
Figure 5:
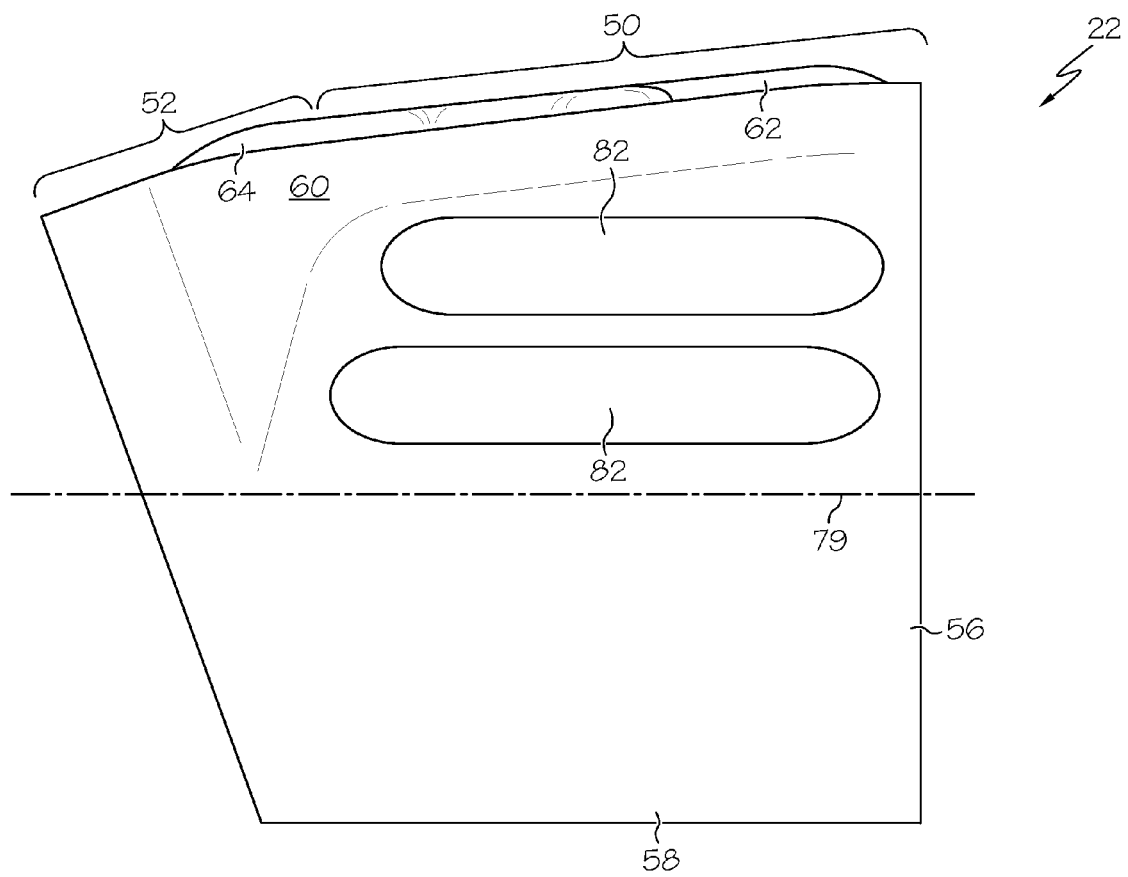

FIGS. 4 and 5 are isometric and side views, respectively, of corrugated flowbody 22. As can be seen in FIGS. 4 and 5, a generally flat plate portion 50 and a curved or arcuate portion 52 are formed in an upper region of corrugated flowbody 22. As is the case in the exemplary embodiment illustrated in FIGS. 1-5, arcuate portion 52 will typically be included within a generally annular or cylindrical section of flowbody 22; however, this is by no means necessary. Flat plate portion 50 accommodates flapper valve element 34 when valve element 34 rotates into the fully open position shown in FIG. 2. More specifically, flapper valve element 34 is hingedly mounted to inlet flange 28, and therefore hingedly coupled to flowbody 22, proximate the leading or upstream edge of generally flat plate portion 50. When transitioning into the fully open position (FIG. 2), flapper valve element 34 rotates into a position substantially adjacent flat plate portion 50. In this manner, flapper valve element 34 is effectively removed from flow passage 40, which enables fluid flow through flow passage 40 to be optimized and which reduces or eliminates valve element flutter. In addition, when flapper valve assembly 20 is deployed onboard an aircraft, removal of flapper valve element 34 from the flow path helps to minimize the accumulation of ice within corrugated flowbody 22 during flight. To enable flapper valve element 34 to rotate into the fully open position (FIG. 2) without obstruction, corrugated flowbody 22 is further formed to include a first substantially flat sidewall portion 54 (shown in FIG. 4) and a second substantially flat sidewall portion 56 (shown in FIG. 5) opposite first substantially flat sidewall portion 54. As shown most clearly in FIG. 4, flat plate portion 50 extends between substantially flat sidewall portions 54 and 56 and meets each of sidewall portions 54 and 56 at a predetermined angle (e.g., approximately 90 degrees). Finally, lower region 58 of corrugated flowbody 22 can be formed to have a substantially arcuate or U-shaped cross-sectional geometry as shown in FIGS. 1-4.

At least two corners 60 are inherently created in the transitional area between flat plate portion 50 and arcuate portion 52. Although contributing a certain amount of structural stiffness to flowbody 22, corners 60 can produce undesirable stress concentrations in neighboring flowbody regions during pressure loading of flapper valve assembly 20. Deflection of flat plate portion 50 and poor stress distribution during pressure loading are especially problematic when flowbody 22 is formed to have a lightweight, thin-walled construction and when the scale of flowbody 22 is increased. Also, during pressure loading of corrugated flowbody 22, flat plate portion 50 is prone to deflection or outward bulging due to its generally flat geometry and relatively large surface area. Therefore, to distribute mechanical stress in a more uniform manner and to minimize the deflection of flat plate portion 50, corrugated flowbody 22 is further provided with at least two reinforcement structures: (i) a flat plate reinforcement structure 62 formed in flat plate portion 50 of flowbody 22, and (ii) a transitional reinforcement structure 64 formed in flat plate portion 50 and extending to arcuate portion 52 of flowbody 22. In a preferred embodiment, transitional reinforcement structure 64 assumes the form of one or more elongated stiffening ribs; consequently, transitional reinforcement structure 64 will be referred to as "elongated stiffening rib 64" herein below. This notwithstanding, it will be appreciated that transitional reinforcement structure 64 can assume various other forms in alternative embodiments.

Flat plate reinforcement structure 62 preferably comprises a plurality of intersecting stiffening ribs. For example, and with reference to FIG. 4, reinforcement structure 62 can include four intersecting stiffening ribs 66, 68, 70, and 72, which each extend outwardly from a common central portion 74 to form a substantially X-shaped reinforcement structure. Due to its unique X-shaped geometry, and in contrast to parallel corrugations, flat plate reinforcement structure 62 contributes both axial and radial stiffness to flat plate portion 50. In addition, reinforcement structure 62 directs mechanical stress to the end caps of stiffening ribs 66, 68, 70, and 72, and, in so doing, helps to distribute stress over flat plate portion 50 in a substantially uniform manner. As a still further advantage, central portion 74 of reinforcement structure 62 is formed in the central area of flat plate portion 50 and consequently significantly reduces the outward bulging of flat plate portion 50 during pressure loading. The dimensions, the orientations, and the cross-sectional shapes of stiffening ribs 66, 68, 70, and 72 will inevitably vary amongst different embodiments. However, it is generally preferred that the length of stiffening ribs 66 and 72 is greater than the length of stiffening ribs 68 and 70; that the angles formed by stiffening ribs 66 and 68 and stiffening ribs 70 and 72 are slightly obtuse, while the angles formed by stiffening ribs 66 and 72 and stiffening ribs 68 and 70 are slightly acute; and that stiffening ribs 66, 68, 70, and 72 are each formed to have a substantially ellipsoidal cross-sectional geometry.

As previously stated, elongated stiffening rib 64 extends from flat plate portion 50 to arcuate portion 52 of flowbody 22. More specifically, elongated stiffening rib 64 extends from central portion 74 of reinforcement structure 62 toward outlet 44 and terminates in arcuate portion 52. Elongated stiffening rib 64 extends between stiffening ribs 66 and 68 of reinforcement structure 62 and between corners 60 formed in the transitional area between flat plate portion 50 and arcuate portion 52. Elongated stiffening rib 64 preferably extends in substantially the same direction as does the longitudinal axis of corrugated flowbody 22 (represented in FIG. 5 by dashed line 79) and, more preferably, extends along an axis that is substantially parallel with the longitudinal axis of flowbody 22. In embodiments wherein elongated stiffening rib 64 extends in substantially the same direction as does the longitudinal axis of flowbody 22, rib 64 may also be referred to as a "longitudinal stiffening rib." As indicated in FIG. 4 at 78, one or more webbed areas may be formed between reinforcement structure 62, and specifically between stiffening ribs 66 and 68, and elongated stiffening rib 64. Stress plots show that elongated stiffening rib 64 provides a significant increase in the axial stiffness of flowbody 22 over the transitional area between flat plate portion 50 and arcuate portion 52, which is otherwise prone to deflection. In addition, elongated stiffening rib 64 directs mechanical stress to its end caps thereby directing stress away from regions of flowbody 22 that are typically subjected to high stress concentrations due to the provision of corners 60. In so doing, elongated stiffening rib 64 serves to distribute stress over corrugated flowbody 22 in a uniform manner and helps to prolong the operational lifespan of flowbody 22.

If desired, one or more stiffening corrugations can also be formed in substantially flat sidewall portion 54 and/or substantially flat sidewall portion 56 of flowbody 22. For example, as shown in FIG. 4, first and second substantially parallel stiffening ribs 80 can be formed in sidewall portion 54, and may each extend along an axis substantially parallel with the longitudinal axis of flowbody 22 (represented by dashed line 79 in FIG. 5). Similarly, as shown in FIG. 5, first and second substantially parallel stiffening ribs 82 can be formed in sidewall portion 56, and may each extend along an axis substantially parallel with the longitudinal axis of flowbody 22 (again, represented by dashed line 79). Stiffening ribs 80 and 82 cooperate to contribute additional axial stiffness to sidewall portions 54 and 56, respectively, to further resist physical deflection of flowbody 22 when subjected to high pressure loading conditions.

Flowbody 22 is preferably formed from one or more metal sheets, the term "metal sheets" utilized to denote relatively thin strips or sheets of material comprised of at least one metal or alloy. In a first embodiment wherein a single metal sheet is utilized to produce flowbody 22, the single metal sheet is first worked or otherwise formed into a generally tubular shape; the opposing longitudinal edges of the single metal are then welded together; and flat plate portion 50, reinforcement structures 62 and 64, and other desired feature (e.g., stiffening ribs 80 and 82 in sidewall portions 54 and 56, respectively) are subsequently formed in the manner described below. In a second embodiment wherein flowbody 22 is formed from multiple metal sheets, a first metal sheet is formed into a first substantially U-shaped body and flat plate portion 50, reinforcement structures 62 and 64, and other desired feature (e.g., stiffening ribs 80 and 82 in sidewall portions 54 and 56, respectively) are then formed therein. A second metal sheet is then formed into a second substantially U-shaped body (e.g., the lower half of flowbody 22 in FIGS. 1-5) and welded to the first U-shaped body. Regardless of the number of metal sheets utilized to produce flowbody 22, it is generally preferred that the weld seam or seams are spatially offset from reinforcement structures 62 and 64; e.g., in embodiments wherein flowbody 22 is produced from a single metal sheet, the weld seam may be positioned substantially opposite reinforcement structures 62 and 64.

In a preferred embodiment, flat plate portion 50, reinforcement structure 62, reinforcement structure 64, and stiffening ribs 82 and 84 are formed as raised or depressed features having a thickness substantially equivalent to the average thickness of the metal sheet or sheets. Flat plate portion 50, reinforcement structure 62, reinforcement structure 64, and stiffening ribs 82 and 84 can be formed utilizing a wide variety of known fabrication techniques including, but not limited to, bulge forming, explosion forming, and stamping processes. These examples notwithstanding, it is preferred that flat plate portion 50, reinforcement structure 62, reinforcement structure 64, and/or stiffening ribs 82 and 84 are formed utilizing a hydroforming process to minimize localized thinning of the metal sheet or sheets. During the hydroforming process, semi-formed flowbody 22 is positioned within a tubular die having negative features corresponding to the desired features of flowbody 22 (i.e., flat plate portion 50, reinforcement structure 62, reinforcement structure 64, and/or stiffening ribs 82 and 84). A specialized bladder is positioned within flow passage 40 of flowbody 22 and rapidly filled with a hydraulic fluid. The bladder expands and deforms flowbody 22 against the walls of the tubular die thereby imparting flowbody 22 with the desired structural features. Additional steps are then performed to complete fabrication of flapper valve assembly 20; e.g., flapper valve element 34 is hingedly coupled to flowbody 22 proximate flat plate portion 50 as described above.

The foregoing has thus provided an exemplary embodiment of a lightweight flapper valve assembly that includes a flat plate portion resistive to physical deflection and that provides a more uniform stress distribution during pressure loading. Various exemplary methods for manufacturing such a lightweight flapper valve assembly have also been provided. As noted above, the above-described flapper valve assembly is relatively lightweight and consequently well-suited for use onboard an aircraft as, for example, a check valve within a cabin air conditioning system; however, it is emphasized that embodiments of the flapper valve assembly can be employed in a wide array of different fluidic systems, whether or not such systems are intended to operate in an airborne environment.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A flapper valve assembly, comprising:
    a flowbody, comprising:
        a generally flat plate portion; and
        an arcuate portion adjacent the generally flat plate portion;
    a flapper valve element hingedly coupled to the flowbody proximate the generally flat plate portion; and
    an elongated stiffening rib formed in the flowbody and extending from the generally flat plate portion to the arcuate portion;
    wherein the flowbody comprises a first metal sheet in which the generally flat plate portion is formed, wherein the elongated stiffening rib is formed as a raised or depressed feature in the first metal sheet, and wherein the elongated stiffening rib reduces outward bulging of the generally flat plate portion when the flowbody is subject to pressure loading.

2. A flapper valve assembly according to claim 1 wherein the flapper valve element resides substantially adjacent the generally flat plate portion in an open position.

3. A flapper valve assembly according to claim 2 further comprising a flat plate reinforcement structure formed in the generally flat plate portion.

4. A valve assembly according to claim 3 wherein the elongated stiffening rib extends from the flat plate reinforcement structure to the arcuate portion of the flowbody.

5. A flapper valve assembly according to claim 3 wherein the flat plate reinforcement structure comprises a plurality of intersecting stiffening ribs.

6. A flapper valve assembly according to claim 5 wherein the plurality of intersecting stiffening ribs forms a substantially X-shaped stiffening structure.

7. A flapper valve assembly according to claim 6 wherein the elongated stiffening rib extends from a central portion of the substantially X-shaped stiffening structure toward the arcuate portion of the flowbody.

8. A flapper valve assembly according to claim 7 further comprising a webbed area formed between the elongated stiffening rib and the X-shaped stiffening structure.

9. A flapper valve assembly according to claim 1 wherein the elongated stiffening rib extends in substantially the same direction as does the longitudinal axis of the flowbody.

10. A flapper valve assembly according to claim 9 wherein the elongated stiffening rib extends along an axis substantially parallel with the longitudinal axis of the flowbody.

11. A flapper valve assembly according to claim 1 further comprising first and second corners formed between the generally flat plate portion and the arcuate portion, the elongated stiffening rib extending between the first and second corners.

12. A flapper valve assembly according to claim 1, comprising:
    a first sidewall portion;
    a second sidewall portion substantially opposite the first sidewall portion, the generally flat plate portion extending between the first sidewall portion and the second sidewall portion;
    a first plurality of substantially parallel stiffening ribs formed in the first sidewall portion; and
    a second plurality of substantially parallel stiffening ribs formed in the second sidewall portion.

13. A flapper valve assembly, comprising:
    a flowbody, comprising:
        a generally flat plate portion; and
        an arcuate portion adjacent the generally flat plate portion;
    a flapper valve element hingedly coupled to the flowbody proximate the generally flat plate portion; and
    a plurality of intersecting stiffening ribs formed in the flat plate portion;
    wherein the flowbody comprises a first metal sheet in which the generally flat plate portion is formed, wherein the elongated stiffening rib is formed as a raised or depressed feature in the first metal sheet, and wherein the elongated stiffening rib reduces outward bulging of the generally flat plate portion when the flowbody is subject to pressure loading.

14. A flapper valve assembly according to claim 13 further comprising a transitional reinforcement structure formed in the flowbody and extending from the plurality of intersecting stiffening ribs to the arcuate portion.

15. A flapper valve assembly according to claim 14 wherein the transitional reinforcement structure comprises a longitudinal stiffening rib.

16. A flapper valve assembly according to claim 15 wherein the plurality of intersecting stiffening ribs comprises first, second, third, and fourth stiffening ribs extending outwardly from a common central portion.

17. A flapper valve assembly according to claim 16 wherein the longitudinal stiffening rib extends from the common central portion to the arcuate portion.

18. A flapper valve assembly according to claim 17 wherein the longitudinal stiffening rib has a length greater than the length of each of the first, second, third, and fourth stiffening ribs.

19. A method for manufacturing a flapper valve assembly, the method comprising the steps of:
    forming a corrugated flowbody from at least a first metal sheet, the corrugated flowbody formed to include a generally flat plate portion, an arcuate portion adjacent the generally flat plate portion, and an elongated stiffening rib extending from the generally flat plate portion to the arcuate portion, the elongated stiffening rib formed as a raised or depressed feature in the first metal sheet reducing the outward bulging of the generally flat plate portion when the corrugated flowbody is subject to pressure loading; and
    hingedly coupling a flapper valve element to the corrugated flowbody proximate the generally flat plate portion.

20. A method for manufacturing a flapper valve assembly according to claim 19 wherein the step of forming comprises utilizing a hydroforming process to form the generally flat plate portion and the elongated stiffening rib in the corrugated flowbody.

* * * * *